C. E. BROWN.
BLOW-OUT PATCH.
APPLICATION FILED OCT. 26, 1912.
1,081,012.
Patented Dec. 9, 1913.
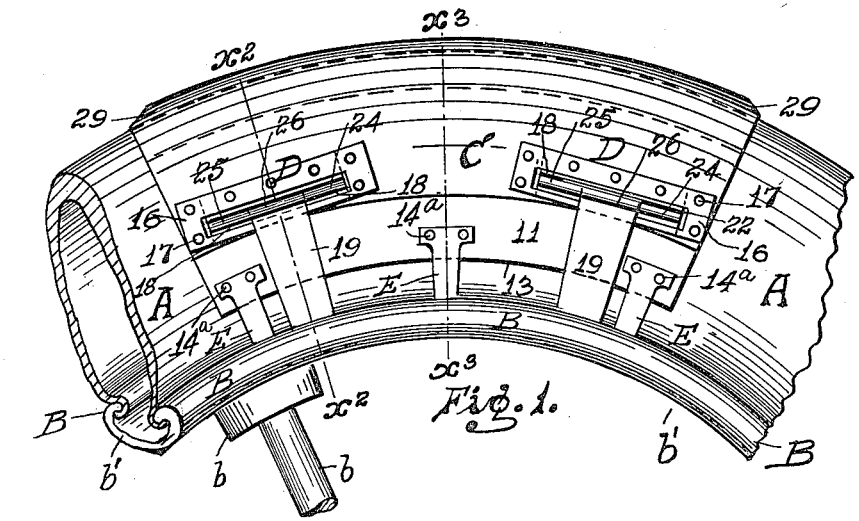
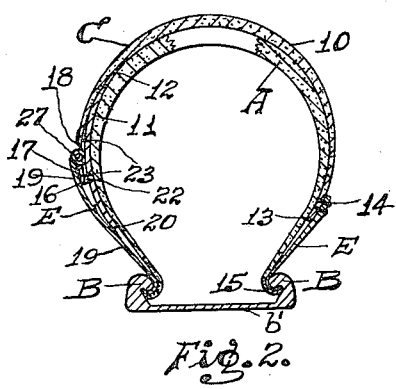
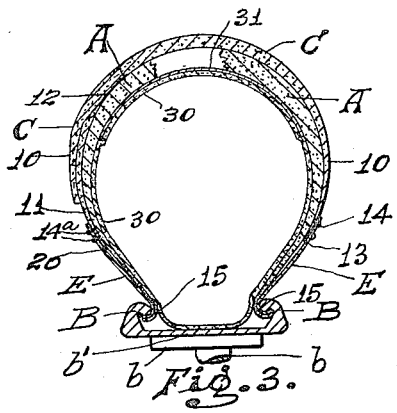
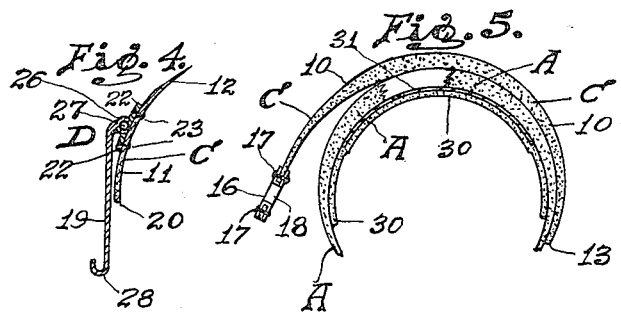
Witnesses:
Inventor:
Charles E. Brown;
By Arden & Seemann,
his Attorneys.

UNITED STATES PATENT OFFICE.

CHARLES E. BROWN, OF LOS ANGELES, CALIFORNIA.

BLOW-OUT PATCH.

1,081,012.  Specification of Letters Patent.  Patented Dec. 9, 1913.

Application filed October 26, 1912. Serial No. 728,014.

*To all whom it may concern:*

Be it known that I, CHARLES E. BROWN, a citizen of the United States, residing at Los Angeles, in the county of Los Angeles and State of California, have invented new and useful Improvements in Blow-Out Patches, of which the following is a specification.

This invention relates to blow out patches, more especially to that class which are adaptable to resilient pneumatic tires for various different kinds of vehicles.

An object of the invention is to provide a blow out patch that can be very quickly and with comparative ease attached to the felly of a vehicle wheel in the vicinity of a "blow-out" of the fabric of a pneumatic tire.

Another object of the invention is the provision of an improved "blow-out" patch that is provided with the means for clamping or drawing it very tightly over a "blow-out" or other hole in a pneumatic tire, so that the hole in the tire is effectually closed and may be inflated again for use.

A further object of the invention is the provision of improvements of the character stated that may be constructed of various kinds of fabric or metal possessed of suitable wearing qualities, preferably divided into two parts, each of which are fastened to the rim of the felly of a vehicle wheel.

A still further object of the invention is the provision of a hinge and leverage tightening means for drawing the two parts together in an interlocked position and then fastening the lever or hinge means in or to the felly of the wheel.

With the above and other objects in view the invention further consists in the novel and useful construction, combination and relative arrangement of parts, members and features, all as hereinafter described, shown in the drawings and finally pointed out in the claims.

In the drawings: Figure 1 is an exterior side elevation of a fragment of an ordinary resilient pneumatic vehicle tire, showing the invention ready for use when fastened over a "blow-out" in the tire; Fig. 2 is a sectional view taken on the line $X^2$—$X^2$ of Fig. 1; Fig. 3 is a sectional view taken on the line $X^3$—$X^3$ of Fig. 1; Fig. 4 is a detail view of a part of the patch having the hinged-lever thereon; and Fig. 5 is a detail view of another part of the patch showing the opening therein for the hinged lever.

Like characters of reference denote like parts throughout the several views of the drawings.

Referring with particularity to the drawings, the letter A designates a pneumatic tire or casing constructed in accordance with the standard practice. The casing A is provided with the customary reinforced rims for engagement in the clencher-rims B of the felly of the wheel $b'$.

The patch C is constructed in two separable parts as at 10 and 11 and the part 10 is provided with the taper end 12 so that when said parts are placed together the patch conforms to the contour of the casing A. The patch C is constructed of layers of fabric and rubber after the manner of the casing A, and has a relatively thickened tread portion.

D denotes the tightening means for interlocking the parts 10 and 11 together and for drawing the entire patch C very tightly on any part of the casing A.

E designates the hooks extending from the parts 10 and 11 which are the means for fastening the patch C to the clencher-rim B.

The patch C specifically comprises the part 10 which extends transversely around the casing A approximately two-thirds of its transverse periphery and is flexible enough to conform to the outer surface of said casing. The part 11 is also designed to conform to the outer surface of the casing A with its tapered end 12 underlapping the part 10. The end 13 of the part 10 is held in parallelism with the clencher-rim B by the hooks E which latter may be fastened to the part 10 as at the rivets 14 and have their lower ends bent over as at 15; such bends 15 conforming to the clencher-rim B. The other end of the part 10 is provided with the plate 16 fastened to such part as at 17 and there is an opening 18 in said plate into which the hinged lever 19 of the tightening means D is fitted when the patch is put on a tire as hereinafter described. On the other side of said casing opposed to the end 13 is the end 20 of the part 11 which is provided with a series of the hooks E fastened thereto as at the rivets 14ᵃ and this end also extends parallel to the rim B.

The tightening means D comprises a base plate 22 which is fastened to the part 11 as at the rivets 23. Extending upwardly from said base plate is the hinge portions 24 and 25. Fitted intermediate the portions 24 and 25 is the hinge end 26 of the lever 19. The pin 27 extends through the portions 24 and 25 and through the hinge 26 thereby allowing the lever 19 to turn when the bent over end 28 of the lever is passed through the opening 18 in the plate 16. Both of the patch parts 10 and 11 are provided with the scarfed or tapered edges or ends 29 so that the tendency to bump is lessened as the wheel is rotated over a roadway.

In most blow-outs of any consequence it is usually found that the casing has a large jagged edged hole therein and in order to protect the customary inner-tube 30 from being pinched and thereby increasing the liability of another blow-out in the same place even when my improved patch is used, I provide the inner lining 31 of canvas or other fabric on the inside of the casing, so that when the inner-tube is inflated it can not swell into said blow-out. This lining 31 need only be of a size great enough to slightly overlap the edges of the blow-out, but it may be extended over any part of said casing as is from time to time thought necessary.

The method of operation of the invention is as follows: When it is found desirable for any cause whatsoever to place a patch on a pneumatic resilient vehicle tire or when it is especially desired to place a patch on a blow-out in a tire, the part 10 is placed on the tire so as to cover the blow-out and the bent over ends 15 of the hooks E are fastened in the clencher-rim. The part 11 is then placed on the other side of the tire and the bent over ends 15 of the like hooks E also fastened on the clencher-rim B but on the side of the wheel opposite to the hooks E of the part 10. The end 28 of the lever 19 is then placed through the opening 18 of the plate 16 and as the lever is pressed downwardly the parts 10 and 11 of the patch C are stretched very tightly over the surface of the tire. The lever is pressed downwardly until the hinge comprising the portions 24 and 25, is brought within the opening 18 substantially as shown in Fig. 2 of the drawings and the end 28 is then very easily hooked over or into the clencher-rim B. The tire is then inflated with air and is again ready for use. The tire should be in a deflated condition when the invention is to be put thereon, which necessarily means that where it is desired to use the invention when a blow-out of a portion of the tire has not occurred the tire should be freed of air. When it is desired to remove the invention from the tire the end 28 is removed from contact with the rim B and the normal resilient quality of the tire casing tending to spring outwardly will therefore cause the lever 19 to be moved without the opening 18 and the hooks 15 can then be loosened from the rim B and the invention taken off the tire and put away until it is desired for use again.

The patch parts 10 and 11 may be constructed of various fabrics or of metal possessing inherent resilient qualities and said parts may be reinforced where the rivets 14, 14ª, 17 or 23 are placed therein, by making said parts slightly thicker at those points or by putting strengthening cleats on said parts thereof. When the lever 19 is hooked over the clencher-rim B the hinge portions 24 and 25 as also the hinge base of the lever 19 are brought up into the opening 18 of the plate 16 until the base-plate 22 contacts with the underside of said plate 16, thereby allowing the hinge parts and the edge of the plate 16 in the opening 18 to contact with each other and thereby assist the lever in holding the part 10 in a tightly stretched position.

I do not desire to be understood as limiting myself to the specific construction, combination, and relative arrangement of parts, members and features as herein shown and described, but reserve the right to vary the same within the scope of the invention and the terms of the following claims:

Having thus fully described my invention, what I claim, and desire to secure by Letters Patent, is:—

1. A patch for pneumatic vehicle tires comprising two separable sections; hooks on each section for fastening them to the wheel; a hingedly fixed lever on one of the sections; and an opening in the other section admitting the lever and separably fastening said sections together.

2. A covering for blow-outs in pneumatic tires, comprising a patch of two separable sections; means for fastening the sections to a wheel containing the tire; an opening in one of said sections; a hinge on the other of said sections having a lever for engagement in said opening to tighten the patch on the tire surface and to bring the hinge in registration with said opening.

In testimony whereof, I have hereunto signed my name to this specification in the presence of two subscribing witnesses.

CHARLES E. BROWN.

Witnesses:
W. F. SEEMANN,
F. G. HENTIG.